(12) United States Patent
Jungmayr et al.

(10) Patent No.: US 12,034,350 B2
(45) Date of Patent: Jul. 9, 2024

(54) ELECTRICAL MACHINE WITH ELECTRIC MOTOR AND MAGNETIC GEAR

(71) Applicant: ebm-papst Mulfingen GmbH & Co. KG, Mulfingen (DE)

(72) Inventors: Gerald Jungmayr, Traun (AT); Günther Weidenholzer, Sarleinsbach (AT); Edmund Marth, Linz (AT)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 886 days.

(21) Appl. No.: 17/050,003

(22) PCT Filed: Apr. 26, 2019

(86) PCT No.: PCT/AT2019/060139
§ 371 (c)(1),
(2) Date: May 11, 2021

(87) PCT Pub. No.: WO2019/204848
PCT Pub. Date: Oct. 31, 2019

(65) Prior Publication Data
US 2021/0265905 A1    Aug. 26, 2021

(30) Foreign Application Priority Data

Apr. 26, 2018    (DE) .......................... 102018110151.1

(51) Int. Cl.
*H02K 49/10*    (2006.01)
*H02K 5/173*    (2006.01)
(Continued)

(52) U.S. Cl.
CPC ......... *H02K 49/102* (2013.01); *H02K 5/1732* (2013.01); *H02K 5/207* (2021.01);
(Continued)

(58) Field of Classification Search
CPC .. H02K 2207/03; H02K 7/003; H02K 5/1732; H02K 49/106; H02K 49/104; H02K 49/102
(Continued)

(56) References Cited

U.S. PATENT DOCUMENTS 5,994,809 A     11/1999 Ackermann
2007/0186692 A1  8/2007 Waszak et al.
(Continued)

FOREIGN PATENT DOCUMENTS

CN    107070176 A     8/2017
EP       2133982 A2   12/2009
(Continued)

*Primary Examiner* — Terrance L Kenerly
(74) *Attorney, Agent, or Firm* — Murphy, Bilak & Homiller, PLLC (57) ABSTRACT

The invention relates to an electrical machine, in particular an electric drive unit comprising an electric motor and a magnetic gear. In accordance with one embodiment the electrical machine has the following: a housing, a first shaft arranged in the housing, by means of which first shaft a first permanent magnet assembly and a second permanent magnet assembly are rigidly connected, and a stator arranged internally on the housing, which stator together with the first shaft forms the electric motor. The electrical machine also has a tubular machine element with a plurality of ferromagnetic pole shoes, into which the first shaft is at least partially inserted, such that the first shaft is situated coaxially with the tubular machine element and the second permanent magnet assembly is situated within the tubular machine element. The first shaft is mounted at a first end on the tubular machine element by means of a first bearing inside the tubular machine element. An annular third permanent magnet assembly is arranged around the tubular machine element so that the second permanent magnet assembly, the tubular machine element and the third permanent magnet
(Continued)

assembly form the magnet gear. Either the tubular machine element is mounted rotatably on the housing and the annular third permanent magnet assembly is rigidly connected to the housing, or the tubular machine element is rigidly connected to the housing and the annular third permanent magnet assembly is mounted rotatably on the housing.

14 Claims, 7 Drawing Sheets

(51) Int. Cl.
  *H02K 5/20* (2006.01)
  *H02K 7/00* (2006.01)
  *H02K 7/08* (2006.01)
  *H02K 9/06* (2006.01)
  *H02K 11/215* (2016.01)
(52) U.S. Cl.
  CPC ............. *H02K 7/003* (2013.01); *H02K 7/083* (2013.01); *H02K 9/06* (2013.01); *H02K 11/215* (2016.01); *H02K 2205/09* (2013.01); *H02K 2207/03* (2013.01); *H02K 2211/03* (2013.01)
(58) Field of Classification Search
  USPC .................................................... 310/113, 90
  See application file for complete search history.

(56) References Cited

U.S. PATENT DOCUMENTS

| | | |
|---|---|---|
| 2008/0149445 A1* | 6/2008 | Kern ..................... F02C 3/113 |
| | | 192/3.56 |
| 2013/0002076 A1 | 1/2013 | Iwasaki et al. |
| 2015/0076948 A1 | 3/2015 | Katou et al. |
| 2016/0241123 A1 | 8/2016 | Ohhashi |
| 2017/0166288 A1 | 6/2017 | Claus et al. |

FOREIGN PATENT DOCUMENTS

| | | |
|---|---|---|
| EP | 3294623 A1 | 3/2018 |
| GB | 2472020 A | 1/2011 |
| WO | 2016180750 A1 | 11/2016 |

* cited by examiner

ELECTRICAL MACHINE WITH ELECTRIC MOTOR AND MAGNETIC GEAR

TECHNICAL FIELD

The present invention regards the field of electrical drives, in particular with reference to an integrated drive unit with an electric motor and a magnetic gear.

BACKGROUND

In a magnetic gear, the two rotors (drive shaft and output shaft) are magnetically coupled and not—as is the case of mechanical gears—mechanically by means of gear wheels. Magnetic gears therefore exhibit less friction loss than mechanical gears, greasing may be omitted, wear only affects load-carrying rolling bearings and much less noise is produced. As opposed to mechanical gears, magnetic gears are not damaged by overloading, but instead only suffer slippage. By reducing the load moment, the magnetic gear can be re-coupled. Iron losses and hysteresis losses may have some negative effects, but these can be kept to a minimum by employing magnetic lamination.

A magnetic gear may be integrated, together with an electric motor, in a structural drive unit (see e.g. EP 2 133 982 A2, GB 2 472 020 A). These types of drive units can be employed like a direct drive and are therefore sometimes called pseudo direct drives. The inventors have set themselves the goal of improving existing concepts for integrated drive units with electric motors and magnetic gears.

SUMMARY

An electric machine will be described, in particular, an electric drive unit with an electric motor and a magnetic gear. In accordance with one embodiment, the electric machine comprises the following: a housing, a first shaft arranged in the housing and to which a first permanent magnet arrangement and a second permanent magnet arrangement are rigidly attached, and a stator which, together with the first shaft, forms the electric motor. The electric machine further comprises a tubular machine element with numerous ferromagnetic pole pieces in which the first shaft is at least partially inserted such that the first shaft lies coaxially to the tubular machine element and the second permanent magnet arrangement lies within the tubular machine element. The first shaft is mounted, at a first end, by means of a first bearing, in and on the inside of the tubular machine element. An annular third permanent magnet arrangement is disposed around the tubular machine element such that the second permanent magnet arrangement, the tubular machine element and the third permanent magnet arrangement form the magnetic gear. In this embodiment, either the tubular machine element is rotatably mounted on the housing and the annular third permanent magnet arrangement is rigidly attached to the housing, or the tubular machine element is rigidly attached to the housing and the annular third permanent magnet arrangement is rotatably mounted on the housing.

In accordance with a further embodiment, the electric machine comprises the following: a first shaft arranged in the housing and to which a first permanent magnet arrangement and a second permanent magnet arrangement are rigidly attached, a stator arranged on the inside of the housing which, together with the first shaft, forms the electric motor, and a tubular machine element that comprises a third permanent magnet arrangement and in which the first shaft is at least partially inserted such that the first shaft lies coaxially to the tubular machine element and the second permanent magnet arrangement lies within the tubular machine element. The first shaft is mounted, at a first end, by means of the first bearing, in and on the inside of the tubular machine element. An annular arrangement with numerous pole pieces is disposed around the tubular machine element such that the second permanent magnet arrangement, the tubular machine element with the third permanent magnet arrangement, and the annular arrangement with numerous pole pieces, together form the magnetic gear. In this embodiment, either the tubular machine element is rotatably mounted on the housing and the annular arrangement with numerous pole pieces is rigidly attached to the housing, or the tubular machine element is rigidly attached to the housing and the annular arrangement with numerous pole pieces is rotatably mounted on the housing.

In accordance with a further embodiment, the electric machine comprises the following: a housing, a first shaft arranged in the housing and implemented as a hollow shaft, on the inside of which a first permanent magnet arrangement and at least one second permanent magnet arrangement are disposed, a stator arranged on the inside of the housing which, together with the first shaft, forms the electric motor, and a tubular machine element with numerous ferromagnetic pole pieces and in which the first shaft is at least partially inserted such that the first shaft lies coaxially to the tubular machine element and the at least one second permanent magnet arrangement lies within the tubular machine element. An annular third permanent magnet arrangement is disposed around the tubular machine element such that the second permanent magnet arrangement, the tubular machine element and the third permanent magnet arrangement form the magnetic gear. In this embodiment, either the tubular machine element is rotatably mounted on the housing and the annular third permanent magnet arrangement is rigidly attached to the housing, or the tubular machine element is rigidly attached to the housing and the annular third permanent magnet arrangement is rotatably mounted on the housing.

BRIEF DESCRIPTION OF THE FIGURES

Embodiments will now be described in the following with reference to figures. The illustrations are not necessarily true to scale and the embodiments are not limited to the aspects illustrated here. Instead importance is given to illustrating the basic underlying principles of the embodiments. The figures show.

DETAILED DESCRIPTION

The embodiments described here concern a new concept for integrating an electric motor and a magnetic gear/transmission in a housing, thereby forming a compact electric drive unit with high power density. Similar drive units are also often referred to as magnetic gear motors (MGM). A high power density is achieved by operating the electric motor at a relatively high speed (e.g. at up to 30,000 rotations per minute or more). The magnetic gear decimates the high rpm to a "normal" value that lies, for example, in the range of 1,000 to 6,000 rotations per minute, wherein the available torque is correspondingly compiled. It goes without saying that the embodiments with electric motors described here can also be operated as generators (provided the electric motor is suitable for generator operation). There is no significant difference between the structural designs of electric motors and generators.

In the great majority of known drive units with magnetic gears and electric motor (MGM units), the magnetic gears and the electric motor are arranged coaxially on one plane. This means that the motor and the magnetic gears do not lie axially offset next to each other, but are instead nested inside of each other and rotatably mounted around a common axis of rotation. This arrangement is sometimes referred to as a pseudo direct drive, for example, and because of it, similar MGM units exhibit a comparably large diameter to length ratio. The embodiments described here are based on a side-by-side arrangement of motor and gears with a relatively small diameter in relation to length.

As compared to MGM arrangements in which motor and magnetic gears are arranged, together with the stator of the motor, coaxially in each other, internally, the side-by-side arrangement has the advantage of allowing for a smaller diameter of the internally disposed rotor. This makes the use of smaller roller bearings possible, which generally reduces bearing losses. As compared to MGM arrangements in which motor and magnetic gears are arranged, together with the stator of the motor, coaxially in each other, externally, the side-by-side arrangement has the advantage of allowing for a smaller effective air gap between the permanent magnet arrangement of the rapidly rotating rotor and the stator.

Figure 1:
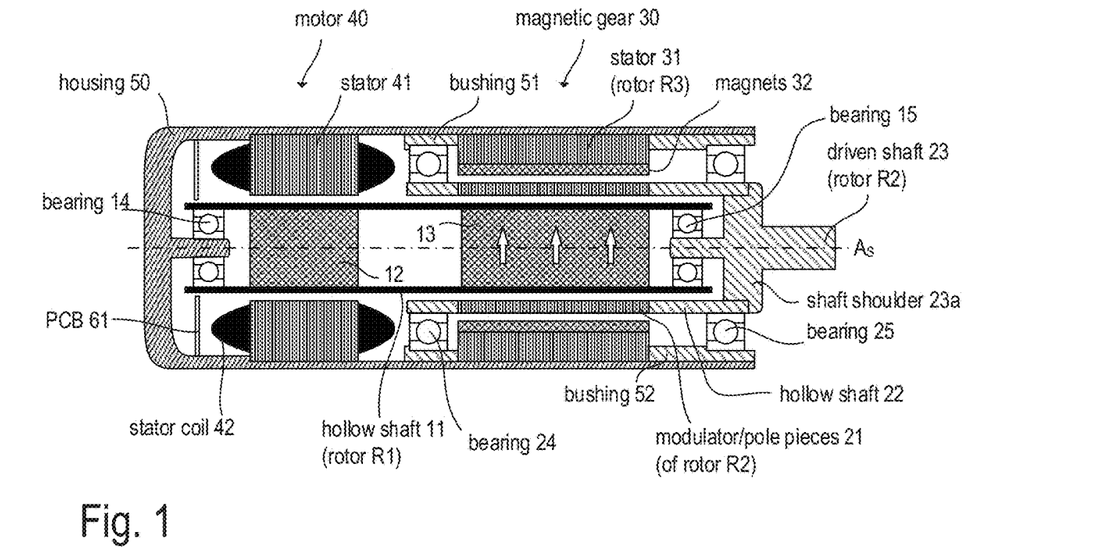
FIG. 1 is a cross-section view showing a longitudinal cross section of a first embodiment of a drive unit with electric motor and magnetic gear.

FIG. 1 is a cross sectional view presenting a cross section (along the axis of rotation $A_S$) of one embodiment of an electric drive unit. As explained earlier on, the embodiment concerns a structural unit in which an electric motor 40 and a magnetic gear 30 are arranged in a housing 50. In accordance with the example illustrated here, the stator 41 of the electric motor 40 is rigidly attached to the housing 50. In one embodiment the stator 41 is implemented with a three-phase winding system. Other numbers of phases, however, are also possible, for example, between one and six. The coils can be arranged concentrated or distributed. A further possibility is the use of toroidal coils (toroidal motor). With appropriate charging of the stator coil a rotating magnetic field is generated in the air gap of the motor that has a number of pole pairs $p_{MOT}$ from among ($p_{MOT} \geq 1$). To guide the magnetic flux, the stator may comprise a core stack (a stack of laminated metal sheets) or a component made of a soft magnetic composite (SMC). An embodiment without a core stack (an air coil motor) could also be envisioned. In both cases a magnetic flux in radial direction is generated.

The rotor of the electric motor is formed by a permanent magnet arrangement 12 with one or more permanent magnets 12. In the example shown here, the permanent magnet arrangement 12 is disposed on the inside of the hollow shaft 11. In particular at high speeds, the hollow shaft 11 can serve to protect the permanent magnet arrangement 12 from centrifugal force. At one end the hollow shaft 11 is mounted on the housing 50 via a roller bearing 14 (e.g. a ball bearing). The other bearing point of the hollow shaft 11 will be discussed further on. The hollow shaft has no need of a shaft shoulder and can therefore be manufactured relatively easily. However, depending on the implementation, the hollow shaft 11 may also comprise numerous shoulders of various diameters. The hollow shaft 11 exhibits a comparatively high bending strength despite a comparatively small moment of inertia, which allows for a construction design of the hollow shaft 11 that keeps the resonances of bending vibrations outside of the RPM region of the quickly rotating rotor.

The electric motor can be implemented, for example, as a brushless synchronous motor (BLDC motor). Alternative motor types may also be employed such as, e.g. asynchronous motors, reluctance motors, etc. that generate a radially directed magnetic flux and which often do not require a permanent magnet arrangement 12 in the rotor. The functioning of a BLDC motor (as well as of other motors of this type) is well known and will not be dealt with in the further discussion.

In the most general of terms, a magnetic gear comprises an inner, rapidly rotating rotor (in FIG. 1 this is rotor R1, which has a small number of pole pairs $p_1$), a modulator (in FIG. 1 this is rotor R2, which has $p_3+p_1$ or $p_3-p_1$ number of pole pairs), and an outer, slowly rotating rotor (in FIG. 1 this is rotor R3 with the pole pair number $p_3$). In many magnetic gear constructions the modulator does not move and the outer rotor R3 is the driven element of the gear. Alternatively (as in the example illustrated in FIG. 1), the outer rotor R3 may also be rigidly attached to the housing 50 and thus be stationary. In this case the modulator (rotor R2) is the driven element of the gear. For the sake of a consistent description, the three main components of the magnetic gear are all referred to as rotors (rotor R1, rotor R2 and rotor R3), even though, depending on the implementation, rotor R2 or rotor R3 could be rigidly attached to the housing.

The $p_1$ pole pairs of the rotor R1 are formed by a second permanent magnet arrangement 13 having at least one permanent magnet which, in the example illustrated here, is(are) also arranged on the inside of the hollow shaft 11. The $p_3$ pole pairs of the rotor R3 are formed by a third annular permanent magnet arrangement 32 which comprises numerous permanent magnets and includes the modulator R2. The $p_3+p_1$ (or, alternatively, $p_3-p_1$) number of pole pairs of the modulator R2 are formed of ferromagnetic material. In the case of $p_3+p_1$ number of pole pairs of the modulator 21 (rotor R2), the reduction ratio of the gear (from the shaft 11 to the driven shaft 23) equals $-(p_3/p_1-1)$. Here the shaft 11 and the driven shaft 23 rotate in opposing directions. Furthermore, the value of the reduction ratio is also changed. In some embodiments the first permanent magnet arrangement 12 and the second permanent magnet arrangement 13 may contact each other or even form one unit. In the latter case the first permanent magnet arrangement 12 would be a segment of a permanent magnet arrangement arranged along the longitudinal axis and the second permanent magnet arrangement 13 would be a second segment disposed next to the first segment in an axial direction.

As shown in FIG. 1, the hollow shaft 11 of the electric motor 40 is, at the same time, also part of the inner, rapidly rotating rotor R1 of the magnetic gear 30. For this reason, the second permanent magnet arrangement 13 which, together with the hollow shaft 11, forms the inner, rapidly rotating rotor R1 (that is, the input) of the magnetic gear 30, is disposed inside of the hollow shaft 11 in the region of the magnetic gear 30. In one embodiment the pole pair number $p_1$ is one (the N-S polarization is indicated by arrows) which, at the given rpm of the driven shaft of the gear results in a high level of gear reduction, allowing for a high rotational speed (and thus a high power output) of the electric motor 40. As an alternative, the pole pair number $p_1$ may also be two.

The modulator (R2) of the magnetic gear is formed by a tubular machine element with, e.g. comprises a further hollow shaft 22, as well as the pole pieces 21 which are arranged along the circumference of the hollow shaft 22. The annular machine element further comprises a shaft 23 (input or output shaft) with a shaft shoulder 23a that is rigidly attached to the hollow shaft 22 at one of its ends. The hollow shaft 22 is therefore closed off at one end by the shaft 23 and is open at the other end. The pole pieces 21 and the hollow shaft 22 may also be constructed as one component. Alternatively or additionally, the hollow shaft 22 and the shaft 23 may be manufactured in one piece. The hollow shaft 22 is mounted at both ends on the housing 50 by means of roller bearings 24 and 25. Depending on the specific construction design, bushings 51 and 52, in which the bearings 24 and 25 are disposed, can be arranged between the bearings 24 and 25 and the inner surface of the housing.

A particularly compact construction design can be achieved by mounting the hollow shaft 11 (rotor R1) on a shoulder section of the shaft 23 on the inside of the hollow shaft 22 (e.g. via roller bearings 15). In this case the hollow shaft 11 extends partially inside of the hollow shaft 22 and is mounted on a shaft section of the shaft 23 at the closed end of the hollow shaft 22. When the number of given pole pieces of the modulator 21 equals p3+p1, the bearing 15 does not "see" the full rpm of the electric motor, but only the difference between the rotational speeds at the input and at the output of the magnetic gear 30.

As previously described, the outer rotor R3 of the magnetic gear 30 is rigidly attached to the housing 50 and is thus, strictly speaking, not a rotor at all, but rather the stator 31 of the magnetic gear 30 and along the circumference of which the permanent magnets 32 may be disposed (pole pair number $p_3$). In order to keep the description consistent, however, this component will be referred to as rotor R3, in particular as, in some embodiments, it may also rotate (and in which case, e.g. the modulator will be stationary, see e.g. FIG. 6). As in the case of the stator 41 of the electric motor, the stator 31 may comprise a core stack (or an SMC component) to guide the magnetic flux and obtain a high magnetic flux density in the air gap.

The housing 50 can be implemented in one or multiple parts. Depending on the motor type, a control system (motor electronics) may be needed. This can be disposed on a printed circuit board (PCB) mounted on the inside of the housing. In the example illustrated here the hollow shaft 11 extends partially through the circuit board, making it possible to also arrange angle sensors directly on the circuit board 61 (cf. also FIG. 14).

The rapidly rotating rotor R1 (hollow shaft 11) is, at the same time, alto the rotor of the electric motor and of the output rotor (in motor operation) of the magnetic gear; due to the arrangement of the bearings 14 and 15, this rotor has no need to connect outwards and can thus be entirely disposed on the inside of the housing 50. Together, the stator 41 of the electric motor 40, the stator 31 (rotor R3) of the magnetic gear 30 and the housing 50 thereby form one compact component. The bearings, in particular the rapidly rotating bearing 14 and the rapidly rotating bearing 15, can be implemented as ceramic bearings or as hybrid bearings, in which the bearing rings and the rolling elements are made of different materials (e.g. the bearing rings of steel and the rolling elements of ceramic). Ceramic and hybrid bearings also exhibit a higher magnetic resistance for the magnetic field lines of the permanent magnet arrangement than conventional bearings made of steel. In particular, such bearings can help prevent a magnetic "short circuit" of the magnetic field lines. As opposed to conventional steel bearings, eddy current losses in the bearings are avoided entirely when hybrid bearings are employed and eddy current losses from the stray magnetic field of the permanent magnet arrangement 12 and/or 13 are reduced.

Figure 2:
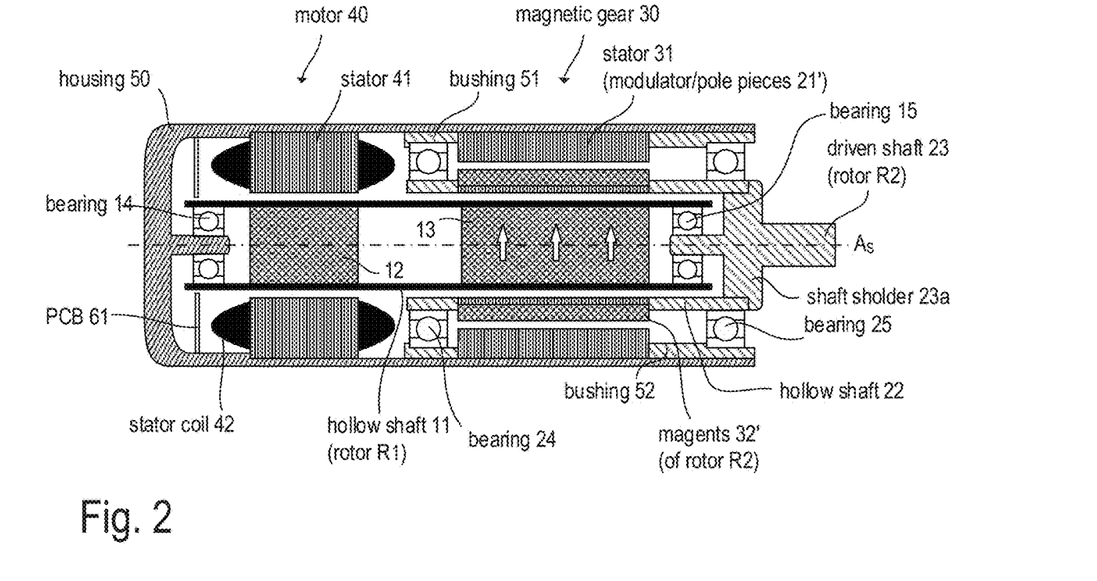
FIG. 2 shows a first modification of the embodiment from FIG. 1, wherein the arrangement of the permanent magnets has been modified.

FIG. 2 shows an alternative to the example of FIG. 1. The embodiment of FIG. 2 is almost identical to the previous example, with the exception that, instead of being arranged on the stator 31 (rotor R3), the permanent magnets 32' (numeral 32 in FIG. 1) are arranged on the rotor R2 (and thus form a part of the aforementioned tubular machine element). Whereas, in FIG. 1, the pole pieces on rotor R2 (the modulator) modulate the permanent magnet field, in FIG. 2 this is performed by the outwardly disposed rotor R3 (wherein, in FIGS. 1 and 2, the rotor R3 is stationary and, strictly speaking, functions as a stator). The stator 31 (rotor R3) comprises an annular arrangement with numerous pole pieces 21'. In the example from FIG. 2 the stator 31 performs the functions of a modulator, whereas the magnetic field is generated by the permanent magnet arrangement 21' of the rotor R2 (the tubular machine element). The remaining construction, in particular with regard to the mounting of the hollow shaft 11 on a shaft segment of the shaft 23 on the inside of the hollow shaft 22, is similar to the construction of the previous example from FIG. 1.

Figure 3:
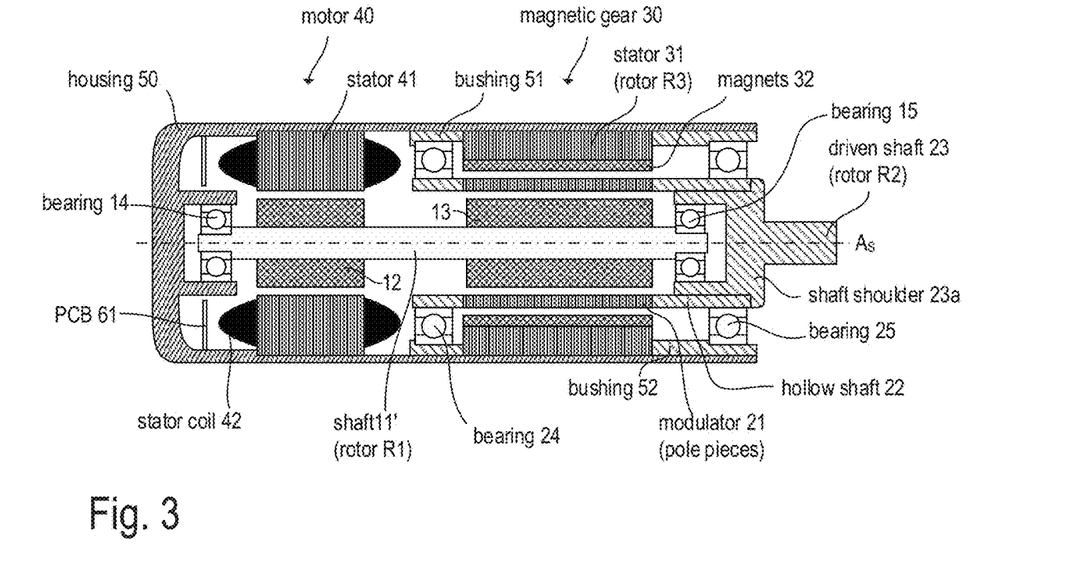
FIG. 3 shows a second modification of the embodiment from FIG. 1, wherein a solid shaft is used as rotor of the electric motor instead of a hollow shaft.

FIG. 3 shows a further alternative to the example from FIG. 1. The embodiment from FIG. 3 is nearly identical to the previous example, with the sole difference that, instead of the hollow shaft 11, a solid shaft 11' is provided. Subsequently, the permanent magnets 13 and 14 are not arranged on the inside, but rather on the outside of the shaft 11'. Nevertheless, as in FIG. 1, the shaft 11' is mounted on the hollow shaft 22 on the inside or in a central boring of the shaft 23. The rest of the construction is the same as in the previous example from f FIG. 1. The embodiment in accordance with FIG. 3 may be suitable, for example, for applications in which no centrifugal force is needed due to a smaller rpm, or a smaller diameter, of the magnet arrangements 12 and 13.

Figure 4:
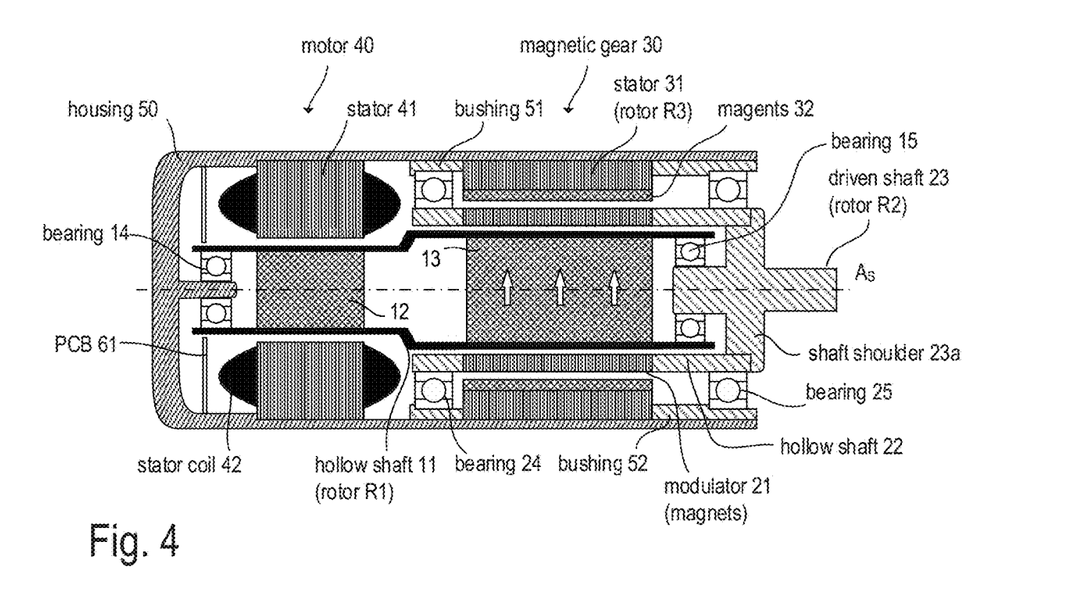
FIG. 4 shows a third modification of the embodiment from FIG. 1, in which the rotor comprises various outside diameters.

FIG. 4 shows a variation of the example from FIG. 1, in which the hollow shaft 11 comprises two separate sections having different diameters. This allows for different diameters in the region of the air gap (i.e. between the outer diameter of the hollow shaft 11 and the inner diameter of the modulator in the magnetic gear and between the outer diameter of the hollow shaft 11 and the stator 41 in the motor), in order to accommodate the electric motor 40 and the magnetic gear 30.

Figure 5:
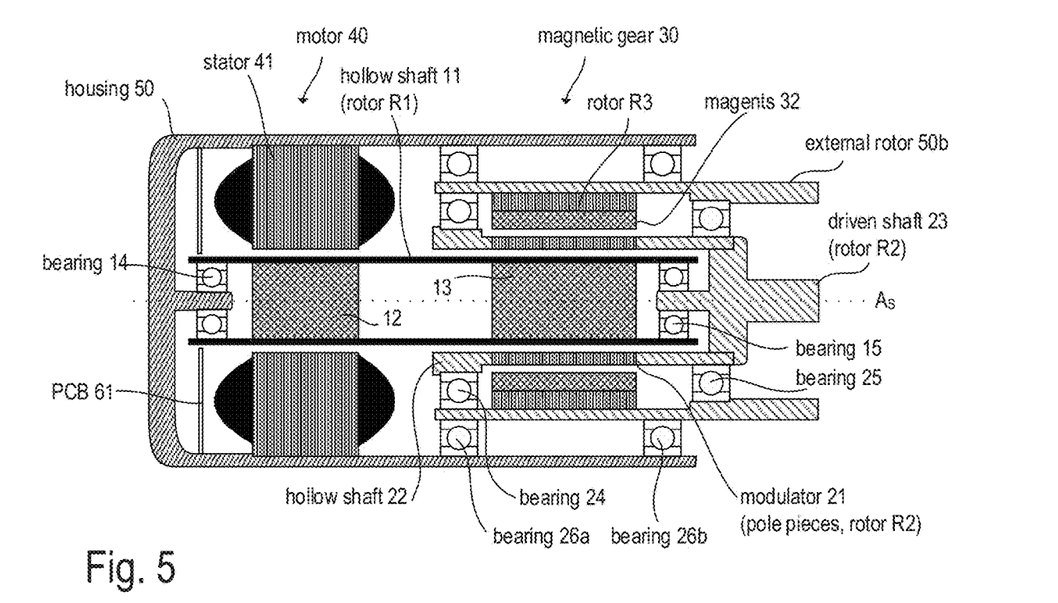
FIG. 5 shows a fourth modification of the embodiment from FIG. 1, wherein the housing comprises two housing parts that are rotatable relative to each other.

FIG. 5 shows a variation of the example from FIG. 1, in which the rotor R3 is mounted relative to the housing 50 (see FIG. 5, bearings 26a and 26b). Rotatably mounted as such, the rotor R3 (which, in FIG. 1 is rigidly attached to the housing 50) can now function as an input or output shaft. Were the rotor R3 to be rendered stationary, the embodiment in accordance with FIG. 5 would function similarly to that of FIG. 1. The bushings 51 and 52 (cf. FIG. 1) are not used in this case. Instead, the sheath 50b that is rotatably mounted on the housing 50 by means of the bearings 26a and 26b functions as an external rotor. The hollow shaft 22 is mounted on the sheath 50b via the bearings 24 and 25 (instead, as in FIG. 1, on the housing 50). As mentioned earlier, in the example shown here the outer rotor R3 of the magnetic gear 30 is not rigidly coupled to the stator 41 of the electric motor 40 and the drive unit therefore comprises two output shafts. The first output is provided by the shaft 23, as in the example from FIG. 1, and the second output is provided by the sheath 50b which, as mentioned, can rotate and thus form the external rotor. One or both of the output shafts can also be used as a drive shaft and the mechanical power from the two output/input shafts can be combined. Depending on whether the net power output is positive or negative, the motor 40 will operate either as a motor or as a generator.

Figure 6:
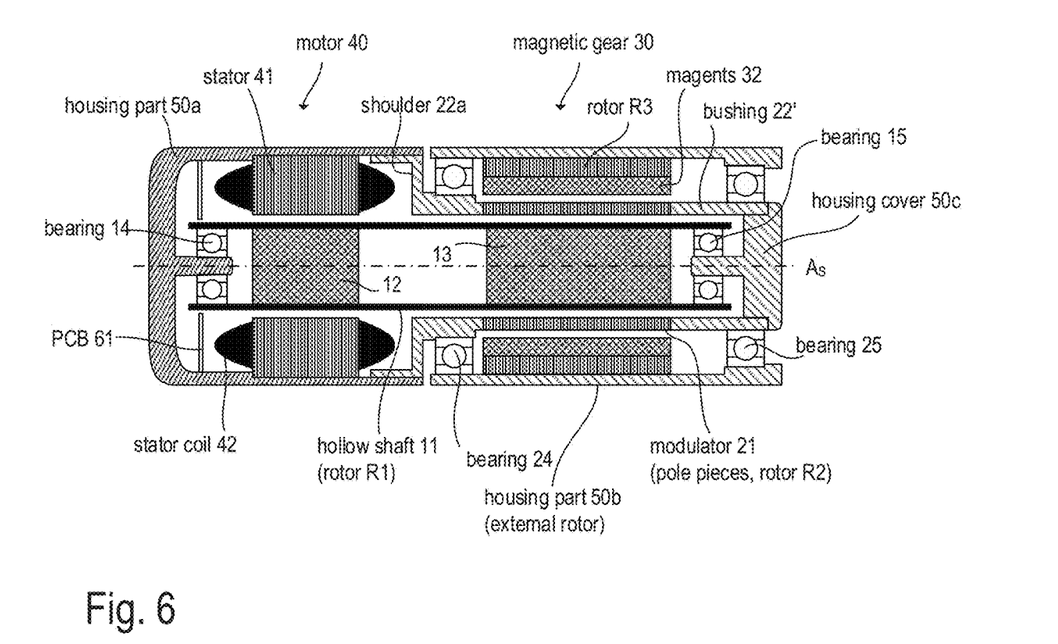
FIG. 6 illustrates a modification of the example from FIG. 5, in which the modulator is rigidly attached to the housing of the electric motor and a further housing part functions as an external rotor.

FIG. 6 illustrates a modification of the example from FIG. 5, in which the modulator 21 is rigidly attached to the housing of the electric motor 40 (housing part 50a). In this example the bearings 26a and 26b are omitted and the magnets 32 (rotor R3) are rigidly attached to a housing part 50b that functions as an external rotor. Instead of the (rotatable) hollow shaft 22, a (non-rotatable) sheath 22' is provided. In the example illustrated here, the sheath 22' has a shoulder 22a that is rigidly attached to the housing part 50a. For example, the sheath 22' (with the shoulder 22a) is screwed or press-fit into the housing part 50a. The output shaft 23 has been replaced by a housing cover 50c. The output is provided by the housing part 50b which, similar to the example from FIG. 5, is an external rotor. The motor 40 has the same construction design in this example as in the previous examples; the difference to the example from FIG. 5 only consists in the rotor R2 (with modulator 21) being "held in place" by the rigid coupling to the housing part 50a. Similar to the previous example, the hollow shaft 11 is mounted on the inside on the housing cover 50c by means of the roller bearing 15 (which, in this example, assumes the task of the shaft 23 with regard to the mounting). The roller bearings 14 and 15 may be constructed virtually the same as in the example from FIG. 5 (depending on whether steel bearings, ceramic bearings or hybrid bearings are to be used). The rest of the present example is designed essentially identical to the example from FIG. 5. With $p_3+p_1$ number of pole pieces of the modulator 21, the reduction ratio of the gear (from the shaft 11 to the output shaft 50b) equals $p_3/p_1$. In this case, the shaft 11 and the output shaft 50b both rotate in the same direction.

The example from FIG. 6 can be further modified by using a solid shaft instead of the hollow shaft 11, as in the example from FIG. 3. In accordance with a further modification the permanent magnets 32 are arranged on the rotor R2 (sheath 22') instead of on the outer rotor R3 (similar to the example from FIG. 2) which, as mentioned earlier with regard to the example from FIG. 2, results in the outer rotor R2 assuming the function of the modulator.

Figure 7:
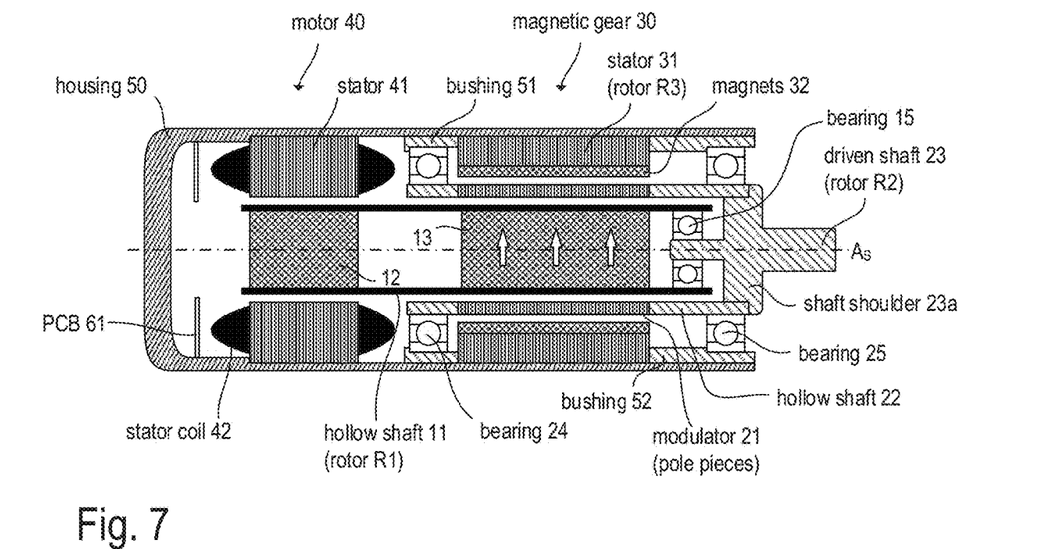
FIG. 7 illustrates a fifth modification of the example from FIG. 1, wherein the motor is implemented as a bearing-free motor.

The embodiment from FIG. 7 is a further modification of the example from FIG. 1, wherein, as the motor 40 is implemented as a bearing-free motor, the bearing 14 can be omitted. The remaining details of this embodiment are provided in the description of FIG. 1. The hollow shaft 11 is, as illustrated in FIG. 7, only mounted on one point by means of the roller bearing 15. In addition to the drive torque, the bearing-free motor also generates the radial forces that are needed to hold the hollow shaft 11 in place. For this purpose the motor 40 may have position sensors that are arranged to measure a radial deflection of the hollow shaft 11 in the region of the electric motor 40. The corresponding description of FIG. 1 contains the remaining details of this embodiment; the modifications and variations described with regard to FIG. 1 can also be applied to the example from FIG. 7. In a further variation of this embodiment the hollow shaft is mounted completely magnetically (actively or passively), in which case the roller bearing 15 may also be omitted.

Figure 8:
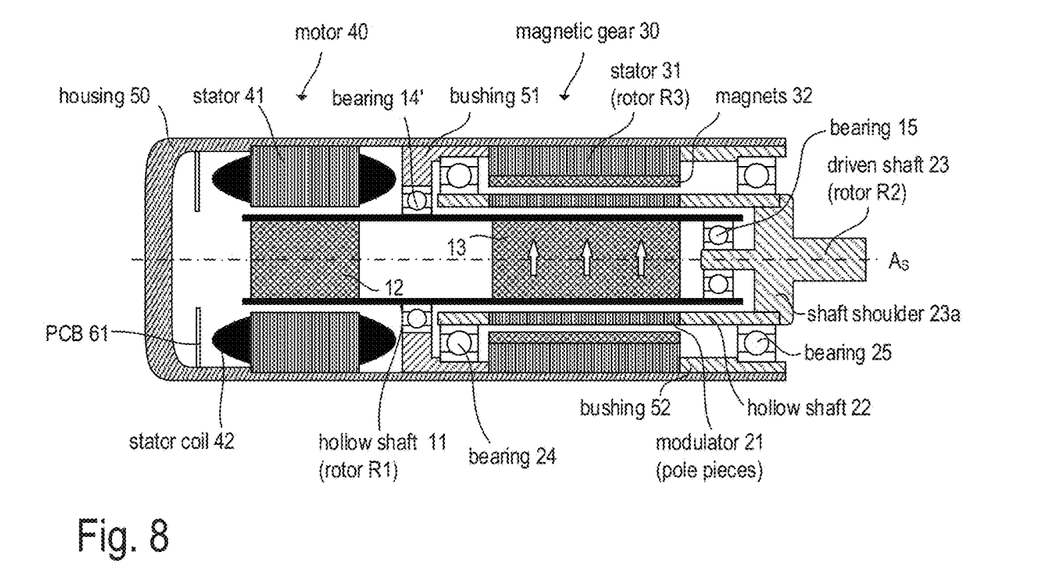
FIGS. 8 and 9 illustrate two further modifications of the embodiment from FIG. 1, wherein the inner hollow shaft 11 is mounted overhanging.

The embodiment of FIG. 8 is a further modification of the example from FIG. 1, wherein the bearing 14 is not arranged on the left end of the hollow shaft 11, but rather between the electric motor 40 and the magnetic gear 30. In this example the bearing of the hollow shaft 11 that lies between the electric motor 40 and the magnetic gear 30 is designated as 14'. As compared to the bearing 14 from FIG. 1, the bearing 14' of FIG. 8 has a larger diameter, which results in greater friction losses in the bearing. The remaining details of this embodiment can be found in the passages describing FIG. 1. Here too, the modifications and variations described with regard to FIG. 1 can be applied to the example of FIG. 8.

Figure 9:
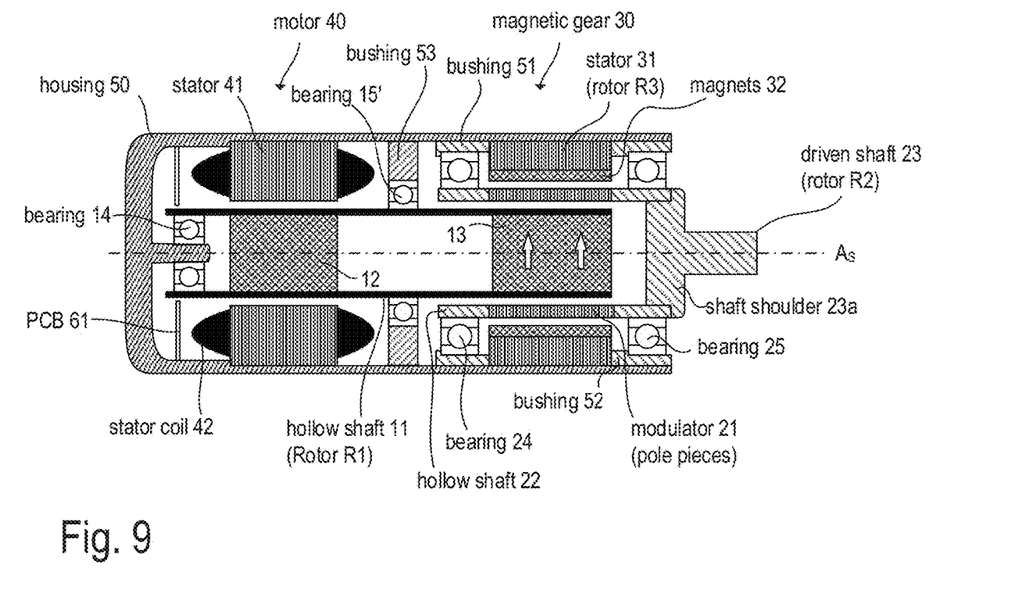

The embodiment of FIG. 9 is a further modification of the example from FIG. 1, wherein the bearing 15 that lies in the hollow shaft 22 is not arranged on the right end of the hollow shaft 11, but instead between the electric motor 40 and the magnetic gear 30. In this example the bearing of the hollow shaft 11 that lies between the electric motor 40 and the magnetic gear 30 is designated as 15'. As compared to the bearing 15 from FIG. 1, the bearing 15' of FIG. 9 has a larger diameter, which results in greater friction losses in the bearing. The remaining details of this embodiment can be found in the passages describing FIG. 1. Here too, the modifications and variations described with regard to FIG. 1 can be applied to the example of FIG. 9. With regard to the examples of FIGS. 8 and 9 it should be noted that, due to the projecting mounting of the hollow shaft 11 (projection on the side of the motor in FIG. 8 and projection on the side of the magnetic gear in FIG. 9), the resonance frequency of the bending vibrations is lower than in the example of FIG. 1. Depending on the rpm of the rapidly rotating rotor R1 (hollow shaft 11), this resonance can cause unwanted problematic vibrations. Furthermore, the axial disposition of the bearings 14' or 15' between the motor 40 and the magnetic gear 30 results in a larger (axial) construction design.

Figure 10:
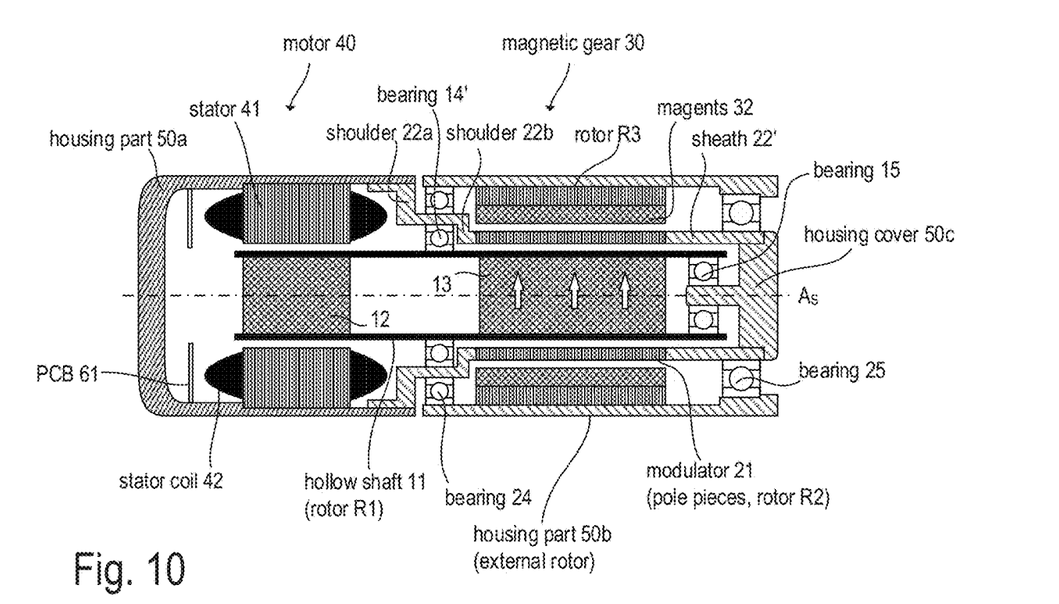
FIGS. 10 and 11 illustrate two modifications of the embodiment from FIG. 6, wherein the inner hollow shaft 11 is mounted overhanging.

The embodiment of FIG. 10 is a further modification of the example from FIG. 1, wherein the bearing 14 is not arranged on the left end of the hollow shaft 11, but instead between the electric motor 40 and the magnetic gear 30. In this example the bearing of the hollow shaft 11 that lies between the electric motor 40 and the magnetic gear 30 is designated as 14'. As compared to the bearing 14 from FIG. 1, the bearing 14' of FIG. 10 has a larger diameter, which results in greater friction losses in the bearing. The remaining details of this embodiment can be found in the passages describing FIG. 6. As in the example of FIG. 6, here the sheath 22' replaces the hollow shaft 22 (rotor R2, modulator/pole piece 21). The sheath 22' may have numerous shoulders of different diameters. In the example shown here the bearing 14' is arranged on shoulder 22b on the inside and the bearing 24 is arranged on shoulder 22b on the outside, ensuring that the radial forces of both bearings lie along an essentially radial line.

Figure 11:
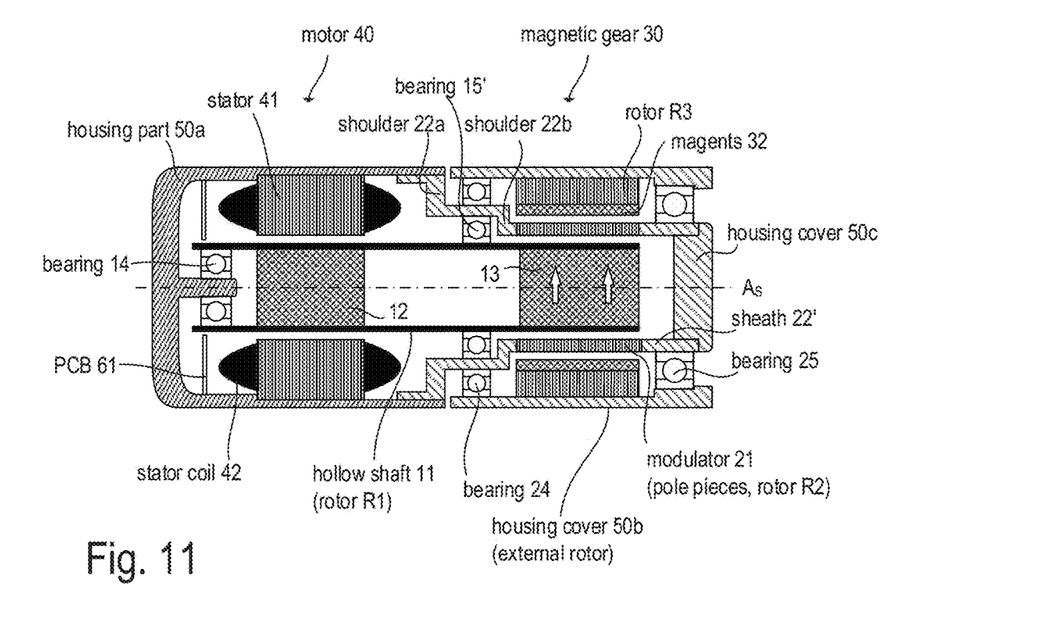

The embodiment of FIG. 11 is a further modification of the example from FIG. 6, wherein the bearing 15 is not arranged on the right end of the hollow shaft 11, but instead between the electric motor 40 and the magnetic gear 30. In this example the bearing of the hollow shaft 11 that lies between the electric motor 40 and the magnetic gear 30 is designated as 15'. As compared to the bearing 15 from FIG. 6, the bearing 15' of FIG. 11 has a larger diameter, which results in greater friction losses in the bearing. The remaining details of this embodiment can be found in the passages describing FIG. 6. As in the example of FIG. 6, here the sheath 22' replaces the hollow shaft 22. The sheath 22' may have numerous shoulders of different diameters. In the example shown here the bearing 15' is arranged on shoulder 22b on the inside and the bearing 24 is arranged on shoulder 22b on the outside, ensuring that the radial forces of both bearings lie along an essentially radial line. Also in the examples shown in FIGS. 10 and 11, due to the projecting disposition of the hollow shaft 11, resonances from bending vibrations may become problematic (depending on the rpm of the motor).

Figure 12:
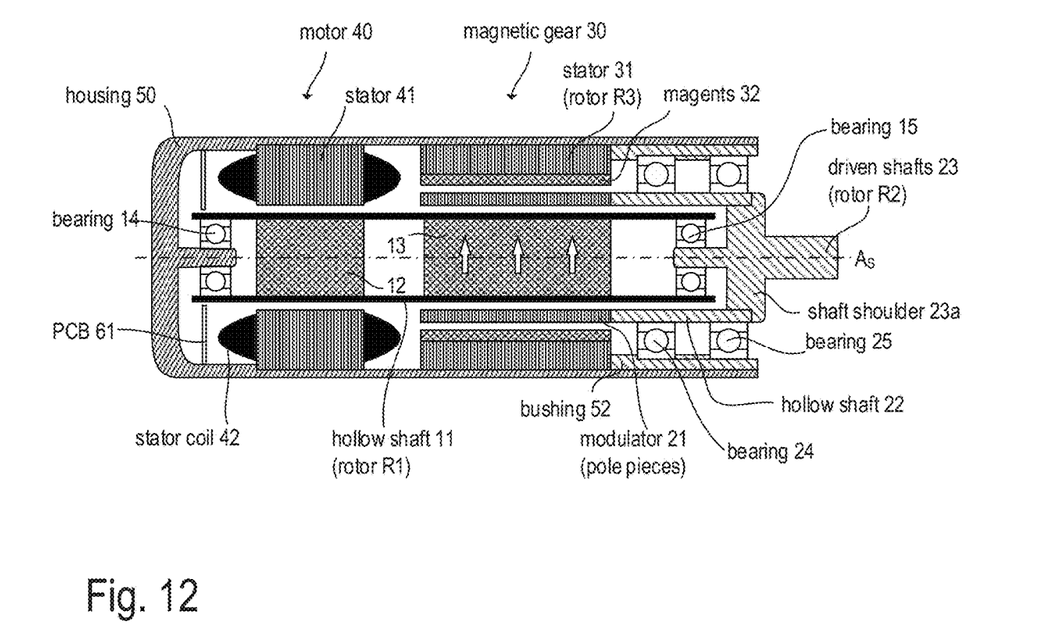
FIG. 12 illustrates a further modification of the embodiment from FIG. 1, wherein the modulator of the magnetic gear is mounted overhanging.

The embodiment of FIG. 12 is a further modification of the example from FIG. 1, wherein the bearing 24 is not arranged to the left of the modulator 21, but rather to the right. The bearings 24 and 25 are thus on the same side of the modulator 21. The remaining details can be found in the description to FIG. 1. The modifications and variations described with reference to FIG. 1 may also be applied to FIG. 12. The present example is particularly suitable for use when the magnetic gear 30 is of a comparatively shorter axial length.

Further embodiments could be created based on the examples described here by combining features of the various examples. For example—in dependency on the application—in all of the embodiments described here, sliding bearings could be used instead of roller bearings. In all of the exemplary embodiments the inner hollow shaft 11 can also be replaced by a solid shaft 11' (cf. embodiment of FIG. 3). Further, by providing the hollow shaft 11 with two or more shaft shoulders of different diameters, the size and position of the magnetically effective air gap can be influenced. The bearing 14 of the hollow shaft that is disposed on the inside (cf. FIG. 1) may also be replaced by a bearing disposed on the outside. Many such modifications can be carried out on the embodiments described here without significantly compromising their performance.

Figure 13:
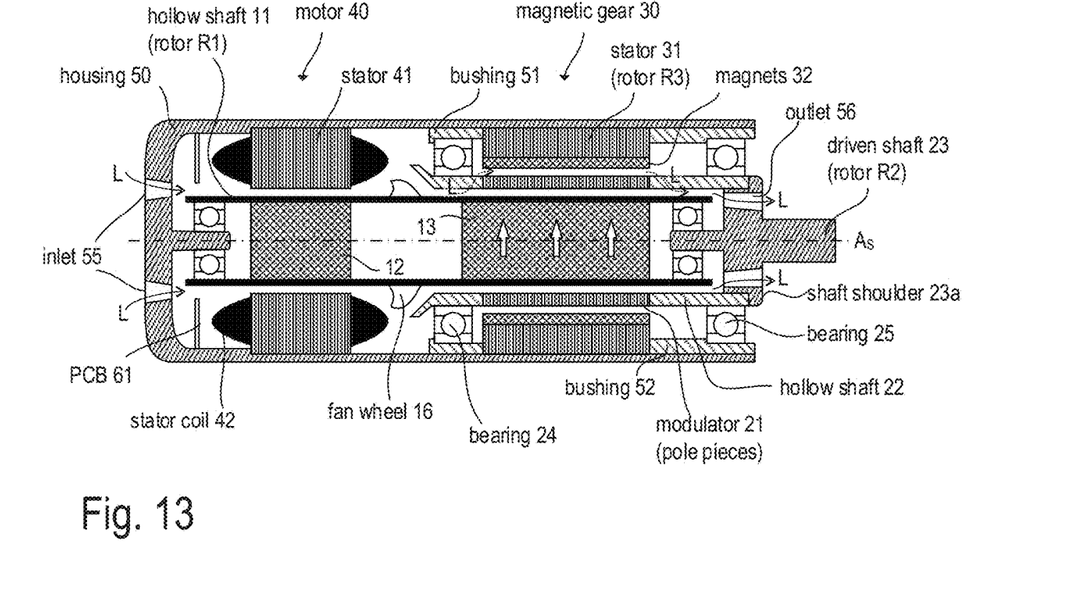
FIG. 13 illustrates a further modification of the embodiment from FIG. 1 with a forced ventilation of the housing inner chamber.

The embodiment of FIG. 13 is a further modification of the example from FIG. 1, here with a forced ventilation of the inner chamber of the housing 50. A fan wheel 16 is arranged on the hollow shaft 11 that produces a convection in the inner chamber of the housing. Air is aspirated into the inner chamber of the housing 50 via one or more inlets 55 arranged on an (axial) end of the housing 50 (e.g. on the front end). The air flowing through the electric motor and the magnetic gear helps to dissipate heat. At the other end, opposite the inlets 55, the air is released to the outside through one or more outlets 56. In the example shown here, the outlets 56 extend through the shaft shoulder 23a of the output shaft 23. The air flow is designated in FIG. 13 as L. The remaining construction design of the example from FIG. 13 is identical to that of FIG. 1, the details of which have been described in the previous passages. The ventilation components described here can also be employed in the other embodiments.

Figure 14:
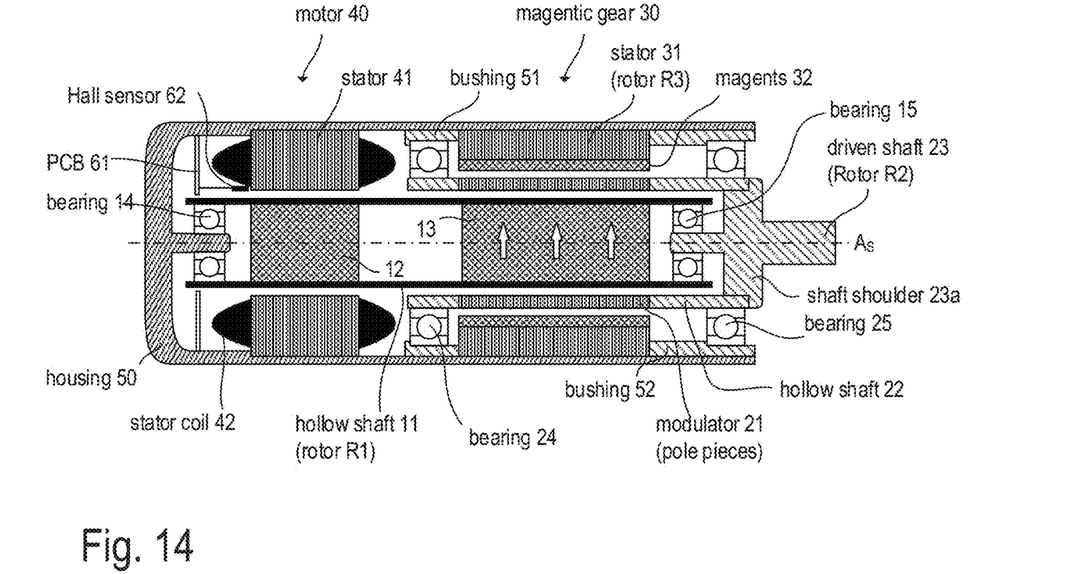
FIG. 14 illustrates a further modification of the embodiment from FIG. 1, in which a magnetic field sensor is provided on the printed circuit board disposed in the housing.

The embodiment of FIG. 14 is a further modification of the example from FIG. 1. In this embodiment the electric motor is, for example, a BLDC motor. In order to control the electronic commutation of the stator coil, the angle position of the rotor must be measured. For this purpose, a magnetic field sensor 62, for example, a Hall sensor or a magneto resistant (MR) sensor, has been compactly incorporated in the circuit board 61. The circuit board 61 has been installed in the housing at a right angle to the axis of rotation, which saves space and allows the sensor 62 to be mounted directly on the circuit board 61 close to the stator coil 42. The remaining construction design of the example from FIG. 14 is identical to that of FIG. 1, the details of which have been described in the previous passages. This arrangement of the sensor 62 on the circuit board 61 can be utilized in all of the embodiments described here in which an angle needs to be measured. In some embodiments it may be necessary to employ a rotation angle sensor (additionally or alternatively to sensor 62) at the output (rotor R2 and/or rotor R3), in order to precisely adjust the angle position of the output shaft.

The invention claimed is:

1. An electric machine, comprising:
   a housing;
   a first shaft arranged in the housing and to which a first permanent magnet arrangement and a second permanent magnet arrangement are rigidly connected;
   a stator arranged on an inside of the housing which, together with the first permanent magnet arrangement, forms an electric motor;
   a tubular machine element rotatably mounted on the housing and comprising a plurality of ferromagnetic pole pieces and in which the first shaft is at least partially inserted such that the first shaft is arranged coaxially to the tubular machine element and the second permanent magnet arrangement is disposed within the tubular machine element, wherein the tubular machine element further comprises an output shaft;
   a first bearing, wherein the first shaft is mounted on a first end on an inside of the tubular machine element by the first bearing; and
   an annular third permanent magnet arrangement rigidly attached to the housing and disposed around the tubular machine element such that the second permanent magnet arrangement, the tubular machine element and the third permanent magnet arrangement form a magnetic gear.

2. The electric machine of claim 1, further comprising:
   a second bearing that mounts the first shaft on the housing on a second end; or
   a second bearing that mounts the first shaft on the housing and which is disposed between the electric motor and the magnetic gear; or
   a second bearing that mounts the first shaft on the tubular machine element.

3. The electric machine of claim 1, wherein the tubular machine element comprises a hollow shaft that is rotatably mounted on the housing by a third bearing and a fourth bearing, and the third permanent magnet arrangement is secured on the inside of the housing, and wherein the output shaft is rigidly connected to the hollow shaft at one end.

4. The electric machine of claim 1, wherein the first shaft is a hollow shaft and the first permanent magnet arrangement and the second permanent magnet arrangement are arranged on an inside of the first shaft.

5. The electric machine of claim 1, wherein the first permanent magnet arrangement and the second permanent magnet arrangement are respectively formed by a first and a second segment of a permanent magnet unit.

6. The electric machine of claim 1, wherein the electric motor is configured to be operated as a generator.

7. An electric machine, comprising:
a housing;
a first shaft arranged in the housing and to which a first permanent magnet arrangement and a second permanent magnet arrangement are rigidly connected;
a stator arranged on an inside of the housing which, together with the first permanent magnet arrangement, forms an electric motor;
a tubular machine element rotatably mounted on the housing and comprising a third permanent magnet arrangement and in which the first shaft is at least partially inserted such that the first shaft is arranged coaxially to the tubular machine element and the second permanent magnet arrangement is disposed within the tubular machine element, wherein the tubular machine element further comprises an output shaft;
a first bearing, wherein the first shaft is mounted on a first end on an inside of the tubular machine element by the first bearing; and
an annular arrangement rigidly attached to the housing and comprising a plurality of pole pieces arranged around the tubular machine element such that the second permanent magnet arrangement, the tubular machine element and the annular arrangement with the plurality of pole pieces form a magnetic gear.

8. The electric machine of claim 7, further comprising:
a second bearing that mounts the first shaft on the housing on a second end; or
a second bearing that mounts the first shaft on the housing and which is disposed between the electric motor and the magnetic gear; or
a second bearing that mounts the first shaft on the tubular machine element.

9. The electric machine of claim 7, wherein the tubular machine element comprises a hollow shaft that is rotatably mounted on the housing by a third bearing and a fourth bearing, and the third permanent magnet arrangement is secured on the inside of the housing, and wherein the output shaft is rigidly connected to the hollow shaft at one end.

10. The electric machine of claim 7, wherein the first shaft is a hollow shaft and the first permanent magnet arrangement and the second permanent magnet arrangement are arranged on an inside of the first shaft.

11. The electric machine of claim 7, wherein the first permanent magnet arrangement and the second permanent magnet arrangement are respectively formed by a first and a second segment of a permanent magnet unit.

12. An electric machine, comprising:
a housing;
a first shaft arranged in the housing and implemented as a hollow shaft, on an inside of which at least one first permanent magnet arrangement and at least a second permanent magnet arrangement are arranged;
a stator arranged on an inside of the housing which, together with the first shaft, forms an electric motor;
a tubular machine element with a plurality of ferromagnetic pole pieces and in which the first shaft is at least partially inserted such that the first shaft is arranged coaxially to the tubular machine element and the at least second permanent magnet arrangement is disposed within the tubular machine element; and
an annular third permanent magnet arrangement that is arranged around the tubular machine element such that the second permanent magnet arrangement, the tubular machine element and the third permanent magnet arrangement form a magnetic gear;
wherein either the tubular machine element is rotatably mounted on the housing and the annular third permanent magnet arrangement is rigidly attached to the housing, or the tubular machine element is rigidly attached to the housing and the annular third permanent magnet arrangement is rotatably mounted on the housing.

13. The electric machine of claim 12, wherein the first permanent magnet arrangement and the second permanent magnet arrangement are respectively formed by a first and a second segment of a permanent magnet unit.

14. The electric machine of claim 13, wherein the electric motor is configured to be operated as a generator.

* * * * *